Patented July 4, 1944

2,352,745

UNITED STATES PATENT OFFICE 2,352,745

HALOGENATED ETHERS

Walter J. Toussaint, South Charleston, W. Va., and Louis G. MacDowell, Jr., Lakeland, Fla., assignors to Carbide and Carbon Chemicals Corporation, a corporation of New York No Drawing. Application March 2, 1943, Serial No. 477,764

7 Claims. (Cl. 260—615)

This invention provides a simple and effective method for making halogenated ethers. It appears to involve a novel chemical mechanism by which halogens and olefins react with certain ethers by splitting the carbon-to-oxygen-to-carbon linkage, all as more fully hereinafter set forth. The invention will be discussed with respect to this assumed new mode of chemical action, which seems to be the most acceptable explanation of the results obtainable, but it must be understood that it is merely by way of explanation, and that the invention is not limited by any theoretical considerations advanced.

The halogenated ethers have attained an important place in industry. They have wide uses as solvents, reaction media, intermediates for the preparation of other products and for various other purposes. One of the most common of these ethers is bis-beta-chlorethyl ether, $ClCH_2CH_2.O.CH_2CH_2Cl$ This compound corresponds to diethylene glycol in which the two hydroxyl groups have been replaced by chlorine atoms. Accordingly, this dichlor ether, its homologues and analogues, may also be styled glycol dihalides for convenience. Thus, beta-chlorethyl, beta'-chlor-ethoxyethyl ether, $ClCH_2CH_2.O.CH_2CH_2.O.CH_2CH_2Cl$, may be called triethylene glycol dichloride, and related compounds can be similarly named.

The formation of the dichlordialkyl ethers by reacting olefines, chlorine and olefine chlorhydrins in a process wherein the chlorhydrin is supplied as such or is formed by the initial reaction of water with part of the chlorine and the olefine, has been described, for example, in Perkins Reissue Patent No. 22,217. It has also been shown in Cox Patent No. 2,017,811 that the operation of this process using ethylene as the olefine results in the formation of some of the diether, triethylene glycol dichloride. The Cox patent does not state the yield of triethylene glycol dichloride obtained, and as a practical matter it has been found to be small in comparison with the main product, diethylene glycol dichloride. The present method likewise uses chlorine (or another halogen) and an olefine as starting materials, and these are caused to react on a polyether containing two or more carbon-to-oxygen-to-carbon linkages. The polyethers useful in the method of this invention can be defined as those aliphatic polyethers in which at least two alkylene groups, $C_nH_{2n}$, or substituted alkylene groups, are present, wherein the value of $n$ in any such group does not exceed 8, and in which each of two vicinal carbon atoms of at least two of the alkylene or substituted alkylene groups is connected with an oxygen atom. This application is concerned with reactions involving open chain polyether compounds, such as polyalkylene glycols (polyethers in which the terminal alkylene radicals possess a hydroxyl group); polyalkylene halohydrins (polyethers in which one terminal alkylene radical bears a hydroxyl group and the other a halogen atom); polyalkylene glycol dichlorides (polyethers in which the terminal alkylene radicals each bear a halogen atom); and polyalkylene glycol mono- or dialkyl or aryl ethers (polyethers in which the terminal alkylene groups are connected through oxygen to other radicals). Embodiments of the invention in which cyclic polyether compounds are involved are the subject of our copending application Serial No. 308,820, filed December 12, 1939.

From the known reaction of glycol chlorhydrin with olefine and chlorine to form diglycol dichlorides, (Perkins Re. 22,217), and the further teaching of Cox Patent 2,017,811 that a similar reaction of diglycol chlorhydrin will yield the triglycol dichlorides it would appear to follow that those reactions or extensions of them to higher homologues would offer a direct method of making any desired polyglycol dichlorides. But as a practical matter this has been found not to be the case. The reason for this is not that the desired reactions fail to occur as taught by the prior investigators mentioned, but rather that the desired starting materials cannot be secured by any convenient means that does not result in much greater amounts of undesired (for the Cox or Perkins reactions) products. Thus, if ethylene chlorhydrin is reacted with the theoretical amount of ethylene oxide in the absence of ethylene and chlorine in an effort to make triethylene glycol chlorhydrin as a starting point in the preparation of tetraethylene glycol dichloride by a reaction analogous to the Cox reaction, the product obtained contains a mixture of various homologous chlorhydrins and may contain also polyethylene glycols. These materials must be separated from the desired triethylene glycol chlorhydrin by separate purification steps, and because the undesired products constitute the high proportion of the materials, the overall result is an impractically low efficiency of operation. Alternatively diglycol chlorhydrin can be made at higher efficiencies using relatively low conversion, and from this, after purification, triglycol chlorhydrin can be made, again using relatively low conversion. This process is expensive, requiring excessive distillation.

By application of the reactions of the present invention to crude mixtures of polyolefine glycol chlorhydrins of high average molecular weight, halogenated ethers of lower molecular weight can be readily prepared with considerable advantage and improvement over processes involving addition reactions the same as, or analogous to, those of the Cox patent. Additionally, the reactions of this invention, by cleaving the one or more carbon-to-oxygen-to-carbon linkages of openchain aliphatic polyether compounds to form halogenated ethers of lower molecular size, allow production of valuable halogenated ethers from by-products and residues which result in the preparation of various glycols, glycol ethers and chlorhydrins in the manufacture of various industrial products.

The unsaturated hydrocarbons and olefines generally are useful in the method of this invention, including, specifically, ethylene and various substituted ethylenes, such as propylene, butylenes, amylenes and hexylenes. Of these, the olefines of unbranched chain structure, or those in which the side chains, if present, are short with reference to the unbranched portion, or those in which the branching occurs at a point relatively remote from the olefine linkage, are preferred. The preferred olefines, for convenience, may be termed normal olefines. In fact, some substituted ethylenes, including styrene (phenyl ethylene), vinyl chloride (monochlorethylene) and isobutylene (unsymmetrical dimethyl ethylene), seem to enter into the reaction of the new method with difficulty and to only a minor extent.

The general reaction of this invention may be illustrated as follows, the particular reactants illustrated having been chosen merely for convenience:

(1) ClCH₂CH₂·O·CH₂CH₂·O(CH₂CH₂·O)ₙCH₂CH₂OH + CH₂=CH₂ + Cl₂ ⟶

Polyglycol chlorhydrin      Ethylene    Chlorine

ClCH₂CH₂·O·CH₂CH₂·O·CH₂CH₂Cl + Cl(CH₂CH₂O)ₙCH₂CH₂OH

Triglycol dichloride          Polyglycol chlorhydrin

In the above equation n is equal to or greater than zero, and splitting can occur at any of the ether oxygen atoms according to our invention.

One possible explanation of the mechanism by which the products are formed is as follows:

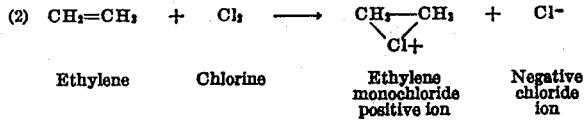

Ethylene    Chlorine    Ethylene monochloride positive ion    Negative chloride ion

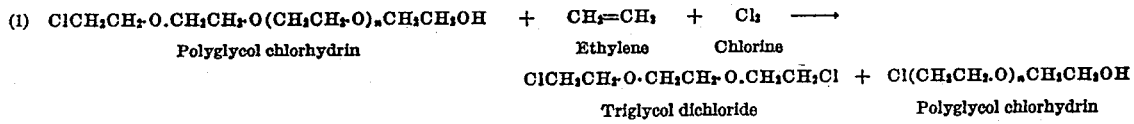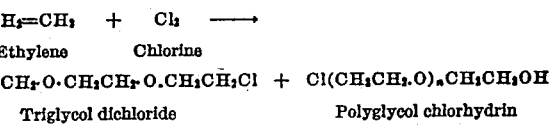

Polyglycol chlorhydrin                      Positive chlorethyl polyglycol chlorhydrin ion

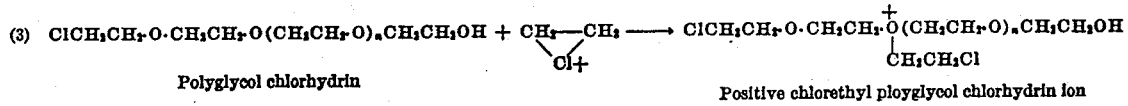

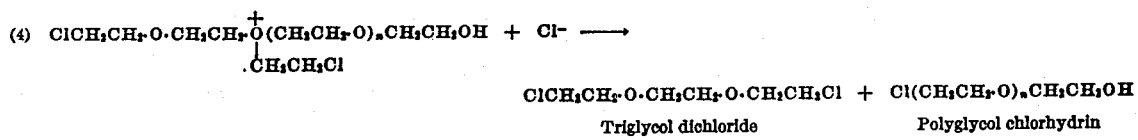

ClCH₂CH₂·O·CH₂CH₂·O·CH₂CH₂Cl + Cl(CH₂CH₂O)ₙCH₂CH₂OH

Triglycol dichloride          Polyglycol chlorhydrin

The reaction illustrated can be conducted very simply by diffusing chlorine and ethylene into a liquid body containing the polyether compound. Experience has shown that good yields and efficiencies are obtained when reaction has progressed to an extent such as to cause an increase of about 200% over the original liquid volume present. This value is more or less arbitrary and represents a convenient extent of reaction rather than a critical one. Both lower and greater percentage volume increases have been used with good results, and in many cases higher volume increases seem desirable. The reaction has been conducted at temperatures ranging from 20° C. to 650° C. without noticeably affecting the yield. So far as has been determined, the only temperature limitations are the freezing and boiling points of the reaction mixture. If the reaction is applied to such high molecular weight products as the solid polyethylene glycols, either a solvent for the solid materials, for instance dioxane, ethylene dichloride or the like, or temperatures above their melting points are required. It has been found desirable at all times to maintain an excess of the olefine and a low concentration of free halogen to reduce the occurrence of substitution reactions, and to avoid the presence of explosive gaseous mixtures.

At the end of the reaction step, the products can be isolated from the reaction mixture by distillation. The actual distillation, if desired, may be preceded by the addition of a strong base to the reaction mixture to neutralize and decompose, respectively, any hydrogen halide and halogen substitution products formed by side reactions. For this purpose, aqueous sodium hydroxide, a lime suspension or any other convenient base can be used. Also the concentration of halide ion can be reduced by adding an olefine oxide during the course of reaction, either continuously or intermittently.

The practice of the method of the invention will be illustrated by the specific examples to follow:

*Example 1*

Ethylene and chlorine were passed into a mixture of polyethylene glycols (polyoxyethylene diols) of an average molecular weight of about 1545 as determined by acetylation. The boiling points of the polyethylene glycol constituents of the mixture were not lower than 240° C. at an absolute pressure of two millimeters of mercury.

After about 10 hours the volume of the reaction mixture had increased by about 200 percent. The addition of ethylene and chlorine was then stopped and the reaction product separated into its various constituents.

Diethylene glycol dichloride ClC₂H₄OC₂H₄Cl; triethylene glycol dichloride.

ClC₂H₄OC₂H₄OC₂H₄Cl and tetraethylene glycol dichloride,

ClC₂H₄OC₂H₄OC₂H₄OC₂H₄Cl were obtained in yields of about 15, 12 and 7.5 percent respectively. An appreciable amount of ethylene dichloride which was formed as a by product was also recovered.

Example 2

A liquid mixture containing 915 grams of polyethylene glycol chlorhydrins, 69 grams of 1,4 dioxane and 16 grams of ethylene chlorhydrin was placed in a vertical glass cylinder 30 inches tall and 3 inches in diameter. A glass coil for the circulation of cooling water was immersed in the liquid, and two ceramic diffusers for the admission of gases were located in the lower part of the cylinder.

The mixture of polyethylene glycol chlorhydrins had an average molecular weight of 470, and contained members of the series of polyethylene glycol chlorhydrins of which the principal ones present were hepta-, octa-, nona-, deca- and undecaethylene glycol chlorhydrins together with small amounts of lower polyethylene glycol chlorhydrins.

Gaseous chlorine and an excess of ethylene were passed into this liquid mixture by means of the diffusers for a period of 15 hours. The temperature of the reaction mixture was maintained at 25° to 35° C. during this period. When the gas flows were stopped, the volume of the liquid mixture had increased by 200% of the original. The crude product weighed 3245 grams and contained 1.5% acid as hydrochloric acid. It was neutralized by the addition of 65 grams of sodium hydroxide dissolved in 200 grams of water. The neutralized product separated into two liquid layers, and the oil layer was separated and fractionally distilled.

Three of the desired dichloro ethers were isolated from the products, viz. 572 grams of bis-beta-chloroethyl ether (diethylene glycol dichloride), 558 grams of beta-chloroethyl, beta'-chloroethoxyethyl ether (triethylene glycol dichloride), and 269 grams of bis-beta- (beta-chloroethoxy) diethyl ether (tetraethylene glycol dichloride). There were also isolated 1400 grams of ethylene dichloride and 154 grams of higher boiling products (probably higher polyglycol dichlorides), while 102 grams of the crude reaction mixture was accounted for as distillation residues and 51 grams as water-soluble material.

It will be seen from these data that the extent of ether linkage splitting accomplished by this operation of the process was considerable. The starting materials were composed of less than 3 gram moles of oxygen-containing substances (polyethylene glycol chlorhydrins, dioxane and ethylene chlorhydrin) whereas the products included more than 8 gram moles of oxygen-containing substances exclusive of the higher boiling materials that were not specifically identified.

Other and larger scale operations gave comparable results, and new method has been proved excellently adapted to simple and efficient commercial practice.

Experiments similar to the foregoing have been conducted in which chlorine and styrene, chlorine and isobutylene, and chlorine and vinyl chloride were reacted with 1,4 dioxane. In every case, chlorine addition to the olefine occurred, and, in the case of vinyl chloride, some naphthodioxane,

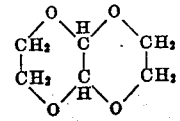

was formed. In no case, however, were sufficient amounts of the desired triethylene glycol dichloride derivatives secured to permit isolation and complete identification of these.

Chlorine and ethylene react in the manner shown with glycol ethers other than those specifically described, for example, with the various polyethylene and polypropylene glycols, with polyethylene glycol chlorhydrins (as shown in the examples) and with polyethylene glycol dichlorides. In every case, lower molecular weight polyglycol dichlorides are obtained as the main products. The extent of degradation (ether splitting) can be varied somewhat by the amounts of chlorine and ethylene supplied to the reaction, and it varies directly with these amounts. In most cases it is preferable to carry the method to high overall yields because of the difficulty of recovering the starting materials. Chlorine and propylene are only slightly less reactive than chlorine and ethylene with respect to the polyethylene glycol derivatives, but their action on polypropylene glycols is not at all energetic. Halogens other than chlorine may, of course, be used observing the usual precautions necessary to their substitution for chlorine, although exact equivalence of action may not follow in every case, particularly in the cases of fluorine and iodine.

Various modifications of the method will be apparent and such modifications are included within the scope of the invention as defined by the appended claims.

This application contains subject matter in common with copending application Serial No. 308,820, filed December 12, 1939.

We claim:

1. Method of making halogenated ethers by splitting carbon-to-oxygen-to-carbon linkages in open chain aliphatic compounds containing more than two such linkages to form halogenated ethers containing fewer ether linkages than the number of carbon-to-oxygen-to-carbon linkages in said aliphatic compounds, which comprises causing halogen and an unsaturated hydrocarbon to react with said aliphatic compounds and separating said halogenated ethers from the products of reaction.

2. Method of making chlorinated ethers by splitting carbon-to-oxygen-to-carbon linkages in open chain aliphatic compounds containing more than two such linkages to form chlorinated ethers containing fewer ether linkages than the number of carbon-to-oxygen-to-carbon linkages in said aliphatic compounds, which comprises causing chlorine and an unsaturated hydrocarbon to react with said aliphatic compounds and separating said chlorinated ethers from the products of reaction.

3. Method of making chlorinated ethers by splitting carbon-to-oxygen-to-carbon linkages in open chain aliphatic compounds containing more than two such linkages to form chlorinated ethers containing fewer ether linkages than the number of carbon-to-oxygen-to-carbon linkages in said aliphatic compounds, which comprises causing chlorine and an olefine to react with said aliphatic compounds and separating said chlorinated ethers from the products of reaction.

4. Method of making halogenated ethers by splitting carbon-to-oxygen-to-carbon linkages in open chain aliphatic polyethers to form halogenated ethers containing fewer ether linkages than the number of carbon-to-oxygen-to-carbon linkages in said polyethers, which comprises causing halogen and an unsaturated hydrocarbon to react with an open chain aliphatic polyether containing at least three groups of the class consisting of alkylene groups, $C_nH_{2n}$, and substituted alkylene groups wherein the value of $n$ in any of such groups does not exceed 8 and in which each of two vicinal carbon atoms of at least two of such groups is connected with an oxygen atom, and thereafter separating said halogenated ethers from the products of reaction.

5. Method of making chlorinated ethers by splitting carbon-to-oxygen-to-carbon linkages in open chain aliphatic polyethers to form chlorinated ethers containing fewer ether linkages than the number of carbon-to-oxygen-to-carbon linkages in said polyethers, which comprises causing chlorine and an olefine to react with an open chain aliphatic polyether containing at least three groups of the class consisting of alkylene groups, $C_nH_{2n}$, and substituted alkylene groups wherein the value of $n$ in any of such groups does not exceed 8 and in which each of two vicinal carbon atoms of at least two of such groups is connected with an oxygen atom, and thereafter separating said chlorinated ethers from the products of reaction.

6. Method of making chlorinated polyethylene ethers by splitting carbon-to-oxygen-to-carbon linkages in open chain polyethylene ethers containing more than two such linkages to form chlorinated polyethylene ethers having fewer ether linkages than the number of carbon-to-oxygen-to-carbon linkages in said polyethylene ethers, which comprises introducing gaseous chlorine and gaseous ethylene into a body of liquid polyethylene ethers of the class consisting of polyethylene glycol chlorhydrins and polyethylene glycols of high average molecular weight, the ethylene being in excess of the chlorine on a molar equivalent basis, and thereafter separating chlorinated polyethylene ethers of lower average molecular weight from the products of reaction.

7. Method of making chlorinated polyethylene ethers by splitting carbon-to-oxygen-to-carbon linkages in open chain polyethylene ethers containing more than three such linkages to form chlorinated polyethylene ethers containing no more than three ether linkages, which comprises passing gaseous chlorine and gaseous ethylene into a mixture containing chiefly polyethylene glycol chlorhydrins of molecular weight above pentaethylene glycol chlorhydrins, the ethylene being in excess of the chlorine on a molar equivalent basis, and thereafter separating di-, tri- and tetraethylene glycol dichlorides from the reaction mixture.

WALTER J. TOUSSAINT.
LOUIS G. MacDOWELL, Jr.

CERTIFICATE OF CORRECTION.

Patent No. 2,352,745.                                         July 4, 1944.

WALTER J. TOUSSAINT, ET AL.

It is hereby certified that error appears in the printed specification of the above numbered patent requiring correction as follows: Page 2, second column, line 8, for "650° C." read --65° C.--; and that the said Letters Patent should be read with this correction therein that the same may conform to the record of the case in the Patent Office Erazer Signed and sealed this 29th day of August, A. D. 1944.

(Seal)                                        Acting Commissioner of Patents.